Patented Aug. 27, 1940

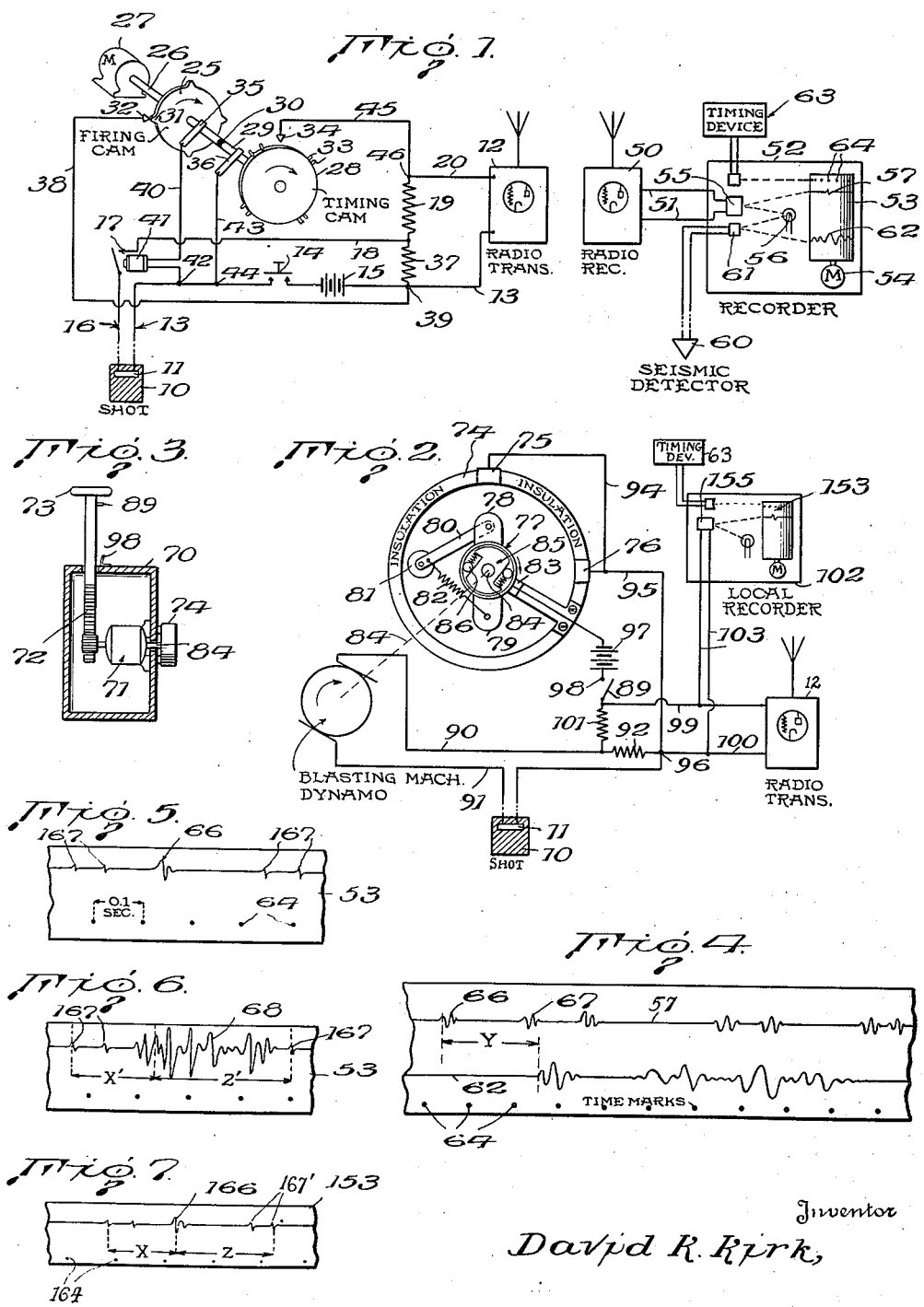

2,212,988

UNITED STATES PATENT OFFICE 2,212,988

APPARATUS FOR TRANSMITTING AND RECORDING SHOT MOMENTS

David K. Kirk, Tulsa, Okla., assignor to Gulf Research & Development Company, Pittsburgh, Pa., a corporation of Delaware Application June 17, 1939, Serial No. 279,757

9 Claims. (Cl. 181—0.5)

This invention or discovery relates to apparatus for transmitting and recording shot moments; and it comprises such an apparatus including means for firing a shot and producing an electrical impulse corresponding to the firing of the shot, switching means coupled to the firing means and constructed and arranged to generate a series of electrical impulses at brief time intervals with respect to the firing of the shot, radio means for transmitting and receiving said impulses and means for recording said impulses; all as more fully set forth and as claimed.

In seismograph prospecting, artificial seismic waves are set up in the earth by firing a shot of dynamite or other explosive. The waves are received at detectors after passage through the upper layers of the earth and are recorded. For useful results, the instant of explosion or of firing of the charge must be very exactly known. An electrical impulse corresponding to the instant of firing or explosion is transmitted to the recorder by a telephone or by radio and is recorded along with the seismic wave records. In radio transmission, the difficulty is sometimes experienced that the shot instant or shot moment is obscured on the record, or even obliterated, by a coincident burst of static. This may require making the shot over again; a costly operation. The present invention is directed to the elimination of this disadvantage of radio shot moment transmission.

Among the objects of the invention are the provision of an improved system of shot impulse transmission and recording wherein there are sent out a series of coordinating impulses, in addition to the shot impulse, in a known or determinable time relation to the shot impulse, and all the impulses are recorded so that even though one or more of the impulses are obscured by static, the instant of time corresponding to the shot explosion can be determined by means of the unobscured impulses. Another object is the provision of apparatus for transmitting and recording shot impulses in seismography, wherein means are provided for generating one or more coordinating electrical impulses in timed relation to the shot impulse, and means are provided for recording these additional impulses.

In carrying out the method of the invention, a charge of dynamite is buried in the ground and fired electrically in a known way, and an electrical impulse corresponding to the instant of explosion (or of firing) is sent out by radio and recorded at a distance, likewise in a known way. Around the time of firing of the shot, that is, shortly before or after or both, a series of electrical impulses is generated in definite and predetermined time relation with respect to the shot firing instant, under chronometric control and these impulses are recorded on the same record with the shot impulse at the receiving station.

In its apparatus aspect the invention includes, in combination with a conventional shot firing circuit, radio transmitter, receiver and recorder, means for emitting spaced electrical time-coordinating impulses around the time of the instant of shot firing. These means can be a simple rotary interrupter device, in which case the coordinating impulses occur at fairly definite relative intervals with respect to each other and to the shot impulse but are in general of unknown absolute time intervals. In this case, an additional recorder is provided at the shot point, so that the shot impulse and the coordinating impulses are all recorded, in two places: at the shot point and at the receiving station, and means are provided for making time marks on both records. Then, by a simple comparison of the two records, the shot firing instant can be determined. Or, the means for emitting the time-coordinating impulses can be chronometric in character, for production of impulses at definite instants in time, in which case the additional recorder is not needed.

The invention will be understood in detail from the extended description to follow.

In the accompanying drawing there are shown diagrammatically two examples of specific embodiments of apparatus within the purview of the invention and schematic reproductions of records obtained with the aid of the invention.

In the drawing,

Fig. 1 is a diagram of a complete shot impulse transmitting and recording apparatus, with chronographic control, Fig. 2 is a diagram of a modified form of apparatus, Fig. 3 is a schematic showing of the blasting machine and circuit breaker of the apparatus of Fig. 2, Fig. 4 shows a typical record as obtained with the apparatus of Fig. 1, and Figs. 5, 6 and 7 show typical records obtained with the apparatus of Figs. 2 and 3.

Referring to the drawing and more particularly to Fig. 1, the apparatus is shown as applied to the firing of a shot comprising a charge of dynamite 10 with an electric blasting cap 11 embedded therein. The blasting cap is connected in circuit with a radio transmitter 12 through a lead 13 from the cap to the transmitter, in which lead is interposed a push button switch 14 and a firing battery 15. The circuit is completed through another lead 16 from the cap, a relay switch 17, a lead 18, a series resistor 19 and shunt resistor 37, and a lead 20 as shown. Resistors 19 and 37 are protective resistors. A pair of cams are provided: a firing cam 25 mounted on a shaft 26 driven by a chronometric or constant speed motor 27 operated in a way known per se at uniform, controlled speed, and a timing cam 28 mounted on an extension 29 of shaft 26. Insulation 30 separates the two shaft sections as shown. The firing cam has a plurality of risers 31 adapted to make contact with a stationary brush 32. The timing cam has a plurality of risers 33 arranged to make contact with a stationary brush 34. The timing cam risers are advantageously spaced in pairs or other small groups of progressively changing separation, as shown, for reasons hereinafter described. Contact is made with shaft 26 by a brush 35 and with shaft 29 by a brush 36. Brush 32 is connected through a lead 38 with lead 13 at point 39, as shown. Brush 35 is connected through a lead 40 with an electromagnet 41 arranged to operate switch 17, and thence to lead 13, junction being made at 42. Brush 36 is likewise connected to lead 13 through a lead 43, junction being made at 44. Brush 34 is connected through a lead 45 with lead 20 at 46.

Some distance away is located the receiving station, which includes a radio receiver 50 with output leads 51 and a recorder 52. The recorder includes a surface 53 of photographic sensitized paper or film driven at uniform rate by a motor 54. An oscillograph element 55 (a small, sensitive galvanometer fitted with a mirror) is arranged to receive the output of the radio receiver and throws a focused beam of light from a lamp 56 on the sensitized surface, producing a trace 57. A plurality of seismic detectors also record on the sensitized surface. For the sake of clarity, only one such detector 60 is shown, and this is connected to a second oscillograph element 61 which produces a trace 62 on the record. A known timing device 63 is arranged to produce a series of time marks 64 (see also Fig. 4) on the sensitized surface at regular intervals; say 0.1 or 0.01 second.

The operation of the system of Fig. 1 is as follows: The motor 27 is started up, which rotates the two cams 25 and 28 at a predetermined constant speed. When it is desired to fire the shot, switch 14 is pushed down for a few seconds. Then when any one of risers 31 makes contact with brush 32, a circuit is completed through battery 15 and solenoid switch 41 thereby closing switch 17. This in turn completes the circuit through the blasting cap and the shot fires. As the shot explodes, the circuit through leads 13 and 16 is broken, and a characteristic fluctuation mark occurs at 66 (Fig. 4) in trace 57 on the recording paper. It is this fluctuation which is relied upon for determining the instant of explosion.

When switch 14 is closed, as described, there is also completed a circuit through the timing cam and radio transmitter so that as each riser 33 makes contact with brush 34, a characteristic fluctuation is produced as indicated at 67 in Fig. 4. When the shock waves sent out from the shot reach the seismic detector 60, trace 62 shows characteristic vibrations as shown in Fig. 4. By measuring the distance Y on the record of Fig. 4, the time for the first explosion wave to reach the detector can be determined. This time interval is of great importance in seismography.

Fig. 4 shows in simplified or schematic manner, the record 53 after photographic development and fixation. The shot firing instant appears at 66 and the timing cam or coordinating impulses at 67. If there is no static, the record has the regular appearance shown in Fig. 4 and the shot firing instant can be read directly from the record.

However, it sometimes happens that a burst of static obscures the shot firing instant, in a manner similar to that shown in Fig. 6 (to be described). In this case the exact instant can be determined by simply measuring the correct distance to the left from any of the marks 67. By virtue of the progressively varying riser spacings on cam 28 (Fig. 1), the impulse marks due to each pair of risers can readily be identified as is apparent from Fig. 4. Any desired pattern of impulse marks can be provided by suitable spacing of risers 33. Ordinarily these risers are so spaced as to produce several marks per second on the record, whereas points 31 on the firing cam are spaced to make contact only every few seconds. The risers on the two cams should, of course, be so arranged with respect to each other that the firing impulse is not masked by a timing impulse.

The two cams and their driving motor and other appurtenances are conveniently mounted as a unit near the radio transmitter.

If desired, the apparatus need not be arranged to send out the time-coordinating impulses under strict chronographic control as in Fig. 1. It is not necessary that the coordinating impulses be in a definite absolute time relation to the shot firing impulses provided all the impulses are recorded at the sending station as well as at the receiving station and that accurate time marks are applied to each record in addition to the impulses. Figs. 2 and 3 show such a modification. Referring to these figures, a blasting machine is provided comprising a case 70 in which is mounted a D. C. dynamo 71 arranged for actuation by a rack 72 with a handle 73 at the top. On pushing down the handle, the dynamo is rotated and develops a current sufficient to fire the cap. A rotary circuit maker is provided which includes a fixed annulus 74 of insulating material attached to the blasting machine case and having two contact segments 75 and 76 in its periphery, as shown. A centrifugal brush is provided which includes a hub 77 carrying a pair of arms 78 and 79. A hinged lever 80 carries a contact roller 81 urged out of a contact with the annulus by a spring 82 fixed to arm 79. A stationary brush 83 makes contact with the hub. The hub is driven from the dynamo shaft 84 through a one-way clutch of conventional construction including a wedge pinion 85 and balls 86 arranged as shown. The purpose of this arrangement is to permit hub 77 to keep on spinning after the rack 72 has reached the bottom of its stroke. The clutch can be dispensed with, in case it is not desired to produce timing impulses subsequent to the shot firing.

The circuit includes a pair of leads 90 and 91 from the dynamo, completing a circuit through a protective resistor 92, lead 93 and the cap 11 as shown. Contact segments 75 and 76 are wired together by a lead 94, as shown, and connected through a lead 95 with lead 93 at a junction 96. Brush 83 is connected through a battery 97 and lead 99 to the radio transmitter. Interposed in this circuit is a switch comprising a stationary contact element 98 and an element 89 arranged to be closed when the blasting machine handle nears the bottom of its stroke; see Fig. 3. The other lead 100 from the transmitter is connected to junction 96 and a protective resistor 101 is connected across leads 90 and 99.

A local recorder is provided, indicated at 102, similar to the recorder 52 of Fig. 1, except, of course, that no provision is made for recording seismograph signals. The recording paper is indicated at 153. An oscillograph element 155 is connected across leads 99 and 100 through a pair of leads 103. A timing device 63 impresses time marks 164 on the record. The receiving station, not shown in Fig. 2, is like that of Fig. 1.

In operation, when it is desired to fire the shot, handle 73 is pushed down. Hub 77 spins. Near the end of the stroke the hub spins fast enough to bring roller 81 against the periphery of annlus 74. Almost at the bottom of the circuit switch 98 closes. Switch 98 being closed, every time roller 81 encounters segment 75 or 76, an impulse is sent out through leads 99 and 100 which is recorded at the local recorder and also at the receiving station. Segments 75 and 76 are shown as unevenly spaced, which facilitates identification of the corresponding impulses. Any desired number of segments and any desired spacing arrangement can be used.

Figs. 5 to 7 illustrate the results obtained with the apparatus of Figs. 2 and 3. Fig. 5 is a portion of record surface 53 (cf. Fig. 1) with the seismic detector record omitted for the sake of clarity. Coordinating impulses are produced in pairs as idicated at 167 and in the absence of static, the shot impulse appears at 66 as in Fig. 1. Referring to Fig. 6, the firing impulse, and one or more of the coordinating impulses, may be badly obscured by a burst of static at 68. However, referring to Fig. 7, the firing impulse 166, as recorded on paper 153, is perfectly definite since static is not involved and the impulse is seen to be in a particular relation to coordinating marks 167'. For example, if the intervals X or Z in Fig. 7 are measured in terms of time by means of time marks 164, it is sufficient to lay out corresponding intervals X' or Z' in Fig. 6 to determine the instant of firing. The actual time intervals between the impulse marks on the record of Fig. 7 may vary as the speed of rotation of hub 77 is variable, but the intervals can be determined from the time marks, which is all that is necessary.

In the apparatus described, the shot impulse is shown as being sent out when the shot is fired. This, in general, does not correspond precisely to the instant of explosion of the shot, which is a little later, but a knowledge of the delay characteristics of the cap allows the instant of explosion to be determined.

What I claim is:

1. In seismograph prospecting apparatus including electrical shot firing means having a part which moves on actuation of said means to fire a shot, a radio transmitter, an energy-carrying transmitter input circuit adapted to be influenced by the firing of the shot so as to create a current impulse in said circuit, a radio receiver and a recorder connected to the output of the receiver, the improvement comprising an auxiliary energy-carrying transmitter input circuit and switching means in said circuit having a movable switching element coupled to the moving part of the shot firing means in driving relation, and adapted on movement of the shot firing means to open and close said auxiliary circuit a plurality of times, whereby to apply a series of impulses to the transmitter for recording together with the shot impulse.

2. The apparatus of claim 1 wherein a second recorder is provided, connected to said two circuits and adapted to record the impulses in said circuits.

3. The apparatus of claim 1 wherein the shot firing means includes a constant speed motor arranged to drive said two elements at a known rate.

4. The apparatus of claim 1 wherein the firing means is an electrical blasting machine and the switching means is actuated by the blasting machine.

5. The apparatus of claim 1 wherein the means for firing the shot comprises a source of current, a switch and chronometric means for driving the switch at a known rate, and the switching means is driven by said chronometric means.

6. The apparatus of claim 1 wherein the switching means is constructed and arranged to produce timing impulses at progressively varying intervals to facilitate identification of the several impulses.

7. In a seismograph prospecting apparatus including electrical shot firing means including an element which moves upon operation of the shot firing means to fire a shot, a radio transmitter, an energy-carrying input circuit for the transmitter arranged to be influenced by the firing of the shot for applying a current impulse to the transmitter, a radio receiver and a recorder connected to the receiver output for recording received impulses, the improvement which comprises an auxiliary energy-carrying input circuit for the transmitter, means in said circuit including a movable element and adapted on operation of the movable element to create a current impulse in the circuit and means coupling the movable element of the shot firing means to the said second movable element in a driving relation such that upon movement of the said elements the second element is operated to create an impulse at a time different from the shot firing instant.

8. In seismograph prospecting apparatus including electrical shot firing means having an element which moves on actuation of said means, a radio transmitter, an energy-carrying transmitter input circuit adapted to be influenced by the firing of the shot so as to create a current impulse in the circuit, a radio receiver and a recorder connected to the output of the receiver, the improvement comprising an auxiliary energy-carrying transmitter input circuit, a switching device in said circuit having a moving switching element and operatively coupled in driving relation to the moving element of the shot firing means in such manner that upon movement of said shot firing means element the switching device makes and breaks said auxiliary circuit a plurality of times, to generate additional current impulses for recording along with the shot impulse.

9. In seismograph prospecting apparatus including electrical shot firing means having a moving part which moves on actuation of said means, a radio transmitter, an energy-carrying transmitter input circuit adapted to be influenced by the firing of the shot so as to create a current impulse in said circuit, a radio receiver and a recorder connected to the output of the receiver, the improvement comprising switching means in said circuit and having a movable switching element coupled to the moving part of the shot firing means in driving relation with respect thereto and adapted on movement of the shot firing means to open and close said circuit a plurality of times, whereby to apply a series of impulses to the transmitter for recording together with the shot impulse.

DAVID K. KIRK.